United States Patent [19]
Yao

[11] Patent Number: 5,830,242
[45] Date of Patent: Nov. 3, 1998

[54] PROCESS FOR PRODUCING METAL OXIDE PRECIPITATES

[75] Inventor: Takeshi Yao, 28-12, Kozu 2-chome, Katano-shi, Osaka 576, Japan

[73] Assignees: Takeshi Yao, Osaka; Hoya Corporation, Tokyo, both of Japan

[21] Appl. No.: 737,157

[22] PCT Filed: Mar. 15, 1996

[86] PCT No.: PCT/JP96/00668

§ 371 Date: Nov. 14, 1996

§ 102(e) Date: Nov. 14, 1996

[87] PCT Pub. No.: WO96/28385

PCT Pub. Date: Sep. 19, 1996

[30] Foreign Application Priority Data

Mar. 15, 1995 [JP] Japan ................................. 7-055636
Sep. 27, 1995 [JP] Japan ................................. 7-249865

[51] Int. Cl.$^6$ .......................... C01F 17/00; C01G 25/02; C01G 25/07
[52] U.S. Cl. ................... 23/300; 23/305 RE; 423/263; 423/608
[58] Field of Search ..................... 423/263, 608; 23/300, 305 RE

[56] References Cited

U.S. PATENT DOCUMENTS 4,769,073   9/1988   Tastu et al. ............................. 423/263
4,882,183   11/1989  Ino et al. ............................. 427/106 C
5,026,421   6/1991   Le Loarer et al. ....................... 423/263
5,433,931   7/1995   Bosserman ............................. 423/263

FOREIGN PATENT DOCUMENTS 63-179082   7/1988   Japan .
64-83670    3/1989   Japan .

OTHER PUBLICATIONS

Database WPI, Section CH, Week 8937, Derwent Publications Ltd., AN 89–266641 of JP 01 192 707 A (1989).

*Primary Examiner*—Gary P. Straub
*Attorney, Agent, or Firm*—Frishauf, Holtz, Goodman, Langer & Chick, P.C.

[57] ABSTRACT

This invention relates to a process for producing metal oxide precipitates, which comprises making a fluoride ion-capturing agent exist in an aqueous solution or hydrofluoric acid solution containing a fluorocomplex compound and/or a fluoride of a rare earth to form precipitates comprising a rare earth oxide or a solid solution containing it as a main component; and a process for producing metal oxide precipitates, which comprises making seed crystal(s) and a fluoride ion-capturing agent exist in an aqueous solution or hydrofluoric acid solution containing a metal fluoro complex compound and/or a metal fluoride of zirconium and/or hafnium to form precipitated crystals comprising said metal oxide crystals or a solid solution containing them as a main component, and is suitable for producing precipitates of a rare earth oxide and crystal precipitates of zirconium oxide and/or hafnium oxide, particularly precipitates such as a thin film, etc. of a metal oxide on the surface of a substrate which has a large area or complicated shape, by using a simple apparatus without need of a heating step for crystallization.

38 Claims, No Drawings

PROCESS FOR PRODUCING METAL OXIDE PRECIPITATES

TECHNICAL FIELD

This invention relates to a process for producing rare earth oxide precipitates, more specifically to a process for producing precipitates of a metal oxide comprising a rare earth oxide, a mutual solid solution of rare earth oxides, or a solid solution containing a rare earth oxide as a main component, from an aqueous solution, for example, a process for forming the precipitates as a thin film on the surface of a substrate or precipitating said rare earth oxide in a liquid.

Also, this invention relates to a process for producing precipitates comprising crystals of zirconium oxide and/or hafnium oxide, more specifically to a process for producing crystal precipitates of a metal oxide comprising zirconium oxide and/or hafnium oxide, a mutual solid solution of both oxides, or a solid solution containing them as a main component in the presence of seed crystal(s) from an aqueous solution, for example, a process for forming a crystal thin film on the surface of a substrate or precipitating said metal oxide crystals in a liquid.

BACKGROUND ART

Zirconium oxide, hafnium oxide and a solid solution thereof, particularly crystals thereof are excellent in heat resistance and corrosion resistance and also have high oxide ion conductivities and electronic conductivities so that they have been used as an electrolyte and an electrode of a fuel cell, an oxygen sensor, an oxygen-enrich membrane, a heating element, a catalyst, etc. Particularly in these uses, in order to make moving distances of electrons and ions smaller to heighten electric conductivity and sensitivity or heighten a gas permeation amount; or in order to obtain a wide surface area or contact area, or in order to save weight, it has been desired to form a thin uniform crystal film or, depending on the use, crystal precipitates existing dispersedly on the surface of a substrate, easily on the surfaces of various substrates. On the other hand, zirconium oxide has been also used as a surface-protecting film of a metal, a semiconductor, ceramics, etc.

Among these uses, when the case of zirconium oxide is taken, when it is used at a high temperature region of 1,100° C. or higher, further 2,370° C. or higher, a zirconium oxide layer may be broken due to change in volume accompanied with phase transition during raising temperature from ordinary temperature to use temperature or cooling. In order to solve this problem, a thin film of a solid solution having the same cubic fluorite type structure even at ordinary temperature as that at the time of high temperature, obtained by dissolving a rare earth oxide such as yttrium oxide, or calcium oxide, etc. in zirconium oxide in a solid state is used as an electrolyte and an electrode of a fuel cell, an oxygen sensor, an oxygen-enrich membrane, a heating element, a catalyst, a surface-protecting film, etc. Further, by dissolving a metal oxide having a valence lower than that of a metal oxide which is a main component, in a solid state, there can be obtained an electrolyte, an electrode, a sensor, an oxygen-enrich membrane, a heating element, etc. in which ionic conductivity and a mobility of oxide ion are heightened.

On the other hand, a rare earth oxide and a solid solution containing it have been used as a catalyst of a decomposition reaction or an oxidation reaction of hydrocarbon and also used as a sensor and a solid electrolyte by utilizing high oxide ion conductivity, and among these uses, utilization as precipitates such as a thin uniform thin film, etc. is advantageous.

As a method for forming such a metal oxide thin film, there may be mentioned methods such as CVD, ion plating, sputtering, etc. However, in these methods, not only a special expensive apparatus is required, but also formation of a thin film having a large area and formation of a thin film on the surface of a substrate having a complicated shape are difficult, in particular, a thin film required for a large fuel cell cannot be obtained easily.

On the other hand, there is a method in which an admixture obtained by kneading powder of a metal oxide with a binder and a dispersant is coated on the surface of a substrate and dried. However, in such a method, it is difficult to form a thin film which is thin and has strength, sufficiently.

A method of using a metal oxide sol formed by hydrothermal treatment has been also proposed. For example, in Japanese Provisional Patent Publication No. 233088/1988 and Japanese Provisional Patent Publication No. 38362/1990, there has been disclosed a process for preparing a metal oxide thin film, in which a mixed aqueous solution containing a zirconium salt and an yttrium salt is subjected to hydrothermal treatment under saturated water vapor pressure and the resulting mixed oxide sol is coated on the surface of a substrate, dried and calcined. Also, in Japanese Provisional Patent Publication No. 319953/1993, it has been disclosed to form a zirconium oxide coating film by suspending zirconium oxychloride in ethanol, adding a boric acid aqueous solution and then aqueous ammonia to the suspension to hydrolyze zirconium oxychloride, thereby obtaining a hydrated zirconia sol containing a boron compound, dipping a substrate in this sol to attach said sol thereto and carrying out acid treatment and drying. Also, Ohashi et al. have disclosed formation of a zirconium oxide coating film by using a sol produced from a metal alkoxide such as zirconium propoxide in Electrochemical Society, Lecture summaries (1994, Sendai) 3C01.

However, in such methods, there are problems that there is a limit in formation of metal oxide precipitates on the surface of a substrate having a large area or a complicated shape, it is necessary to crystallize a gel coated on the surface of a substrate by heating, there is possibility that heat shrinkage or deformation is caused during heating, and some substrates cannot stand such heating.

In Japanese Provisional Patent Publication No. 215421/1984, it has been disclosed to form a coating film of zirconium oxide on the surface of a silicon steel plate by carrying out electrolysis in an aqueous solution containing a complex compound of zirconium, for example, ammonium zirconium hexafluoride by using the silicon steel plate as a cathode. However, in this method, a substrate is limited to a conductive material, and also application to a substrate having a complicated shape is difficult.

In Japan Ceramics Society, Annual meeting in 1994 (Nagoya), Lecture previous manuscripts 1G26, Shimose et al. have disclosed a method for obtaining a zirconium oxide thin film stabilized with yttrium oxide, by a migration electrode-position method. However, also in this case, it is necessary to calcine the resulting thin film by heating to 1,300° C.

In Japanese Provisional Patent Publication No. 179082/1988, it has been disclosed to precipitate a film of zirconium oxide on the surface of a substrate by adding an additive such as aluminum chloride to a zirconium oxide-supersaturated solution containing zirconium hydrofluoric acid. However, use of seed crystal(s) has not been disclosed therein, and precipitates obtained are amorphous state zirconium oxide and are not crystals.

An object of the present invention is to provide a process for producing metal oxide precipitates, in which, by using a simple apparatus, precipitates with various forms such as a thin film, etc. can be formed on the surface of a substrate having a large area, etc. and also precipitates of a rare earth oxide or crystal precipitates of zirconium oxide and/or hafnium oxide can be easily formed on the surface of a substrate having a complicated shape, which cannot be obtained by a conventional method for forming metal oxide precipitates, and also a heating step for stabilizing these precipitates by crystallization is not required.

The present inventors have studied intensively in order to achieve the above object and consequently found that by making a fluoride ion-capturing agent exist in an aqueous solution or hydrofluoric acid solution containing a metal fluoro complex compound and/or a metal fluoride corresponding to a desired metal oxide, precipitates of said metal oxide or a solid solution thereof, for example, a thin film thereof can be formed easily on the surface of a substrate, and found that particularly by making seed crystal(s) exist during precipitation, crystal precipitates can be formed easily, to accomplish the present invention.

DISCLOSURE OF THE INVENTION

That is, the process for producing metal oxide precipitates of the present invention comprises making a fluoride ion-capturing agent exist in an aqueous solution or hydrofluoric acid solution containing a metal fluoro complex compound and/or a metal fluoride of a rare earth metal to form precipitates comprising a rare earth oxide or a solid solution containing them as a main component.

Further, the second process for producing metal oxide precipitates of the present invention comprises making seed crystal(s) of zirconium oxide and/or hafnium oxide, and a fluoride ion-capturing agent exist in an aqueous solution or hydrofluoric acid solution containing a metal fluoro complex compound and/or a metal fluoride of zirconium and/or hafnium to form precipitates comprising crystals of zirconium oxide and/or hafnium oxide, or crystals of a solid solution containing them as a main component.

BEST MODE FOR PRACTICING THE INVENTION

As the precipitates of the rare earth oxide to be formed by the present invention, there may be mentioned precipitates of scandium oxide, yttrium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide and lutetium oxide. In addition thereto, precipitates of a solid solution containing these metal oxides as a main component, i.e., a mutual solid solution comprising the rare earth metal oxides at an optional ratio; and a solid solution containing the rare earth metal oxide and a small amount of an oxide of an alkaline earth metal or a transition metal, for example, a solid solution represented by $(La_2O_3)_{0.9}(CaO)0.1$ are also formed by the present invention.

These rare earth oxide type precipitates may be amorphous, but when they are used continuously or repeatedly at high temperature, they are preferably crystalline state which is a stable phase.

Further, as the precipitates of the metal oxide to be formed by the present invention, there may be mentioned crystal precipitates of zirconium oxide and/or hafnium oxide. In addition thereto, crystal precipitates of a solid solution containing these metal oxides as a main component, i.e., a solid solution comprising these metal oxides at an optional ratio mutually; and a solid solution containing the metal oxides and a small amount of an oxide of an alkaline earth metal, a transition metal or a IIIA group metal, for example, a solid solution containing zirconium oxide as a main component, in which magnesium oxide, titanium oxide or aluminum oxide is dissolved in the state of a solid solution are also formed by the present invention.

The metal fluoro complex compound to be used as a starting material in the present invention is a water-soluble acid or salt represented by the formula (I):

$$A_aM_bF_c \hspace{2cm} (I)$$

(wherein A's may be the same or different from each other and each represent a hydrogen atom, an alkali metal atom, an ammonium group or coordinated water; M represents zirconium, hafnium and/or a rare earth metal; and a, b and c are each a number of 1 or more and a number of making said metal complex compound electrically neutral). As A, there may be mentioned a hydrogen atom; an alkali metal atom such as lithium, sodium, potassium, rubidium and cesium; an ammonium group; and coordinated water, and A may correspond to one or two or more of them. M is a metal atom corresponding to the above-mentioned metal oxide, and M may correspond to one or two or more of them. When b is 1, a is a number of 1 or more and corresponds to a number obtained by subtracting the valence of M from c. c is a number of 5 or more when M is a tetravalent metal such as zirconium and hafnium, and is 4 or more when M is a trivalent metal such as yttrium.

Such a metal fluoro complex compound may be exemplified by a fluorozirconium complex compound such as $H_2ZrF_6$, $Na_2ZrF_6$, $K_2ZrF_6$, $Rb_2ZrF_6$, $Cs_2ZrF_6$, $(NH_4)_2ZrF_6$, $Na_3ZrF_7$, $(NH_4)_3ZrF_7$, $Na_4ZrF_8$, $(NH_4)_4ZrF_8$, $Na_5ZrF_9$ and $(NH_4)_5ZrF_9$; and a fluorohafnium complex compound, a fluorocerium (IV) complex compound, etc. corresponding thereto. Also, it may be exemplified by a fluoroyttrium complex compound such as $HYF_4$, $H_2YF_5$, $H_3YF_6$, $NaYF_4$, $Na_2YF_5$, $Na_3YF_6$, $Na_4YF_7$, $Na_5YF_8$, $KYF_4$, $K_2YF_5$, $K_3YF_6$, $NH_4YF_4$, $(NH_4)_2YF_5$, $(NH_4)_3YF_6$, $(NH_4)_4YF_7$ and $(NH_4)_5YF_8$; and a fluoroscandium complex compound, a fluorolanthanum complex compound, a fluorocerium (III) complex compound, etc. corresponding thereto. These metal fluoro complex compounds may be used singly or as a mixture of two or more, if necessary.

Also, the metal fluoride of the above metal is preferably soluble in hydrofluoric acid and may be exemplified by zirconium fluoride, hafnium fluoride and gadolinium fluoride.

Such a metal fluoro complex compound and a metal fluoride exist in the form of a corresponding complex ion and/or an ion in the solution.

The metal fluoro complex compound and metal fluoride to be used in the present invention may be one which is prepared by any method, preferably one which is prepared as a metal fluoro complex compound and/or a metal fluoride of said metal in the system by reacting a metal oxide or solid solution corresponding to the desired precipitates, or a plural number of metal oxides corresponding to the respective components of the solid solution in hydrofluoric acid.

Also, the metal fluoro complex compound may be prepared by dissolving a corresponding metal hydroxide or oxyhydroxide in an aqueous solution containing an alkali metal hydrogen difluoride such as ammonium hydrogen difluoride or sodium hydrogen difluoride and reacting these.

The metal fluoro complex compound is used by being prepared as an aqueous solution generally having a concentration of $10^{-9}$ to 10 mol/L, preferably $10^{-6}$ to $10^{-1}$ mol/L, which is, however, different depending on the compound. There may be also used an aqueous solution obtained by further adding an excess metal oxide to the prepared aqueous solution containing the metal fluoro complex compound to obtain a high concentration solution or a saturated solution and then removing an undissolved metal oxide by filtration. Or, there may be used a solution obtained by dissolving the metal oxide in hydrofluoric acid generally having a concentration of 0.005 to 50% by weight, preferably 0.01 to 50% by weight to form the metal fluoro complex compound and/or the metal fluoride in the system with a concentration of generally $10^{-9}$ to 10 mol/L, preferably $10^{-6}$ to $10^{-1}$ mol/L.

When the desired metal oxide is zirconium oxide and/or hafnium oxide, or a solid solution containing them as a main component, seed crystal(s) is/are made to exist in the above aqueous solution or hydrofluoric acid solution containing the metal fluoro complex compound and/or the metal fluoride, whereby precipitates obtained become crystals.

When the desired metal oxide is a rare earth oxide or a solid solution containing it as a main component, in order to obtain crystal precipitates having heat stability in the similar manner, seed crystal(s) may be made to exist in the above solution similarly without any problem.

The crystal precipitates thus obtained have a stable phase as compared with amorphous precipitates, and even when they are used at high temperature continuously or repeatedly, they do not exhibit change in state such as crystallization by thermal history so that they have excellent heat stability. Also, from the same reason, physical properties such as electric conductivity, etc. are stable without being changed by a reaction at high temperature. Moreover, a structure such as configuration of atoms, etc. are clear so that precise control of physical properties can be carried out from correspondence to a theory. Further, the crystal precipitates are dense as compared with amorphous precipitates and also have excellent dynamic properties such as strength, etc. and airtightness.

As the seed crystal(s), preferred are precipitates of the desired metal oxide, for example, a metal oxide which is the same as a thin film component, and when the desired precipitates are a solid solution, said solid solution or one or two or more of metal oxides constituting it may be used. The seed crystal(s) may have a chemical composition which is different from that of the desired precipitates if they are of the same or similar crystal system. The seed crystal(s) may be generally as fine as 0.001 to 10 $\mu$m, and an existing amount thereof may be optional, but it may be minute. Due to existence of the seed crystal(s), a precipitation rate can be raised. Further, according to the findings of the present inventor, due to existence of the seed crystal(s), precipitates belonging to the same crystal system as the crystal system of said seed crystal(s) can be formed.

In order to make the seed crystal(s) exist(s), by a method of suspending powder of an oxide which becomes seed crystal(s) in the above-mentioned aqueous solution or hydrofluoric acid solution containing the metal fluoro complex compound and/or the metal fluoride and using a filter paper or filter through which fine crystallites are passed when the oxide power is removed by means of filtration or the like, etc., fine crystallites may be made to remain in the solution to be used as seed crystals. Or, before a substrate is soaked in the solution, the seed crystal(s) may be previously added and dispersed on the substrate. Further, both of these methods may be used in combination.

In the present invention, by adding or inserting a fluoride ion-capturing agent which forms a stable compound with fluoride ions, into the aqueous solution or hydrofluoric acid solution containing the metal fluoro complex compound and/or the metal fluoride, corresponding metal oxides or a solid solution thereof is/are precipitated. Such metal oxides or a solid solution thereof may be precipitated as fine crystals from the solution or may be precipitated in the form of a thin film or the like on the surface of a substrate by soaking the substrate in said solution.

The fluoride ion-capturing agent to be used in the present invention includes homogeneous type which is used by being dissolved in a liquid phase and heterogeneous type which is solid matter. Depending on the purpose, one of them may be used, or both of them may be used in combination without any problem.

The homogeneous type fluoride ion-capturing agent may be exemplified by a boric acid such as orthoboric acid, metaboric acid, etc.; sodium hydroxide, aqueous ammonia, etc. For example, when zirconium oxide is to be precipitated from $Na_2ZrF_6$ by using orthoboric acid, the equilibrium represented by the formula (III) is shifted in a direction that $F^-$ is consumed so that the equilibrium represented by the formula (II) is shifted in a direction that $F^-$ is produced, and as a result, zirconium oxide is precipitated. Such a capturing agent is used generally in the form of an aqueous solution. Addition of said capturing agent may be carried out at one time or intermittently in several divided amounts, or may be carried out continuously at a controlled supplying rate, for example, a constant rate.

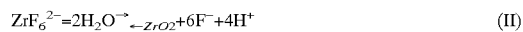

The heterogeneous type fluoride ion-capturing agent may be exemplified by a metal such as aluminum, titanium, iron, nickel, magnesium, copper, zinc, etc.; ceramics such as glass; and other inorganic substance such as silicon, calcium oxide, boron oxide, aluminum oxide, silicon dioxide, magnesium oxide, etc. When such solid matter is added or inserted into the solution, $F^-$ in the vicinity of the solid matter is consumed to reduce its concentration, whereby chemical equilibrium is shifted to precipitate the metal oxide. When such solid matter is used, depending on the addition or insertion method and the reaction conditions thereof, the precipitates, for example, a thin film of the metal oxide can be precipitated on the entire surface of a substrate soaked in the solution, or precipitation thereof can be limited to a selected local portion, i.e., the vicinity where said solid matter exists. Alternatively, by using the homogeneous type and heterogeneous type fluoride ion-capturing agents in combination, the precipitates, for example, a thin film on the surface of a substrate can be thickened partially.

The amount of the homogeneous type fluoride ion-capturing agent may vary depending on the kind and shape of the precipitates, but it is generally $10^{-4}$ to 1,000% based on the amount corresponding to the equivalent amount of fluoride ions in the solution, and when a good thin film is to be formed by precipitation, it is preferably used in the range of $10^{-2}$ to 500%. When a large amount of said capturing agent is added to the system at one time, shifting of equilibrium occurs rapidly so that crystals are produced in the solution to make the liquid turbid, whereby a portion which does not contribute to formation of the precipitates on the surface of a substrate effectively may be generated. Therefore, when it is intended to form the precipitates, for example, a thin film on the surface of a substrate, it is preferred to carry out addition of said capturing agent gradually.

As the substrate, there may be used a wide range of substances which carries metal oxide precipitates to be formed, for example, a thin film, or for forming a multilayer structure with said precipitates, or for being protected from oxidation or the like by a thin film formed. Such a substance may be exemplified by a metal, ceramics, an organic polymer material, etc.

The time when the substrate is soaked in the solution containing the metal fluoro complex compound and/or the metal fluoride may be before, simultaneously with or after addition of the fluoride-capturing agent. However, when a substrate which may be corroded by the system is used, it is necessary to pay attention to the composition of the solution, the reaction conditions and the time of soaking. For example, the hydrofluoric acid solution is used, it is preferred that the substrate is soaked after the fluoride ion-capturing agent is added. In this case, after the substrate is soaked, an additional fluoride ion-capturing agent may be further added. Also, there may be used a substrate which also serves as the heterogeneous type fluoride ion-capturing agent, such as aluminum and glass. The shape of the substrate is optional and is not limited to a plate shape, and one having a complicated shape can be also used.

The reaction temperature can be set optionally in such a range that the system maintains the solution, but it is preferably in the range of 10° to 80° C. The reaction time is also optional, and the reaction time is elongated depending on the amount of the desired precipitates and the thickness in the case of a thin film.

As described above, the metal oxide precipitates, for example, a thin film having a thickness of 0.001 to 10 $\mu$m or a film having a thickness which is more than that can be formed on the surface of the substrate. The precipitates thus formed can be obtained as crystallized metal oxide precipitates without a heating step such as heat treatment, but a heating step may be provided depending on the purpose. The state of precipitation on the surface of the substrate may vary depending on the material of the substrate. In the case of plastic, a thin film is easily formed on the surfaces of polyethylene terephthalate (hereinafter referred to as "PET") and polyether sulfone (hereinafter referred to as PES). On the surface of polystyrene, a thin film is not formed under ordinary conditions, and when the heterogeneous type fluoride ion-capturing agent such as a metal or glass exists in the vicinity, a thin film is formed at that portion.

Utilizability in Industry

According to the present invention, by using a simple apparatus, zirconium oxide, hafnium oxide and/or a rare earth oxide, or a solid solution containing them as a main component can be precipitated. Particularly by precipitating them on the surface of a substrate, precipitates in the form of a thin film or the like can be easily formed on the surface of a substrate having a large area or the surface of a substrate having a complicated shape, which cannot be obtained by a conventional formation method. The precipitates thus obtained do not particularly require a heating step for crystallization so that neither distortion nor crack is generated. This fact is particularly advantageous in the case of forming a thin film having a large area or a complicated shape.

Also, the precipitates of the metal oxide obtained by the present invention is useful as an electrolyte and an electrode of a fuel cell, an oxygen sensor, an oxygen-enrich membrane, a heating element, a catalyst, etc.

Particularly, the precipitates obtained in a crystalline state are not changed in the state by heat history at high temperature and have excellent heat stability so that they are suitable as a sensor used at high temperature, etc.

Particularly in the case of zirconium oxide, etc., in the uses as a solid electrolyte in a fuel cell, an oxygen sensor, an oxygen-enrich membrane, etc., stability at high temperature, airtightness and mechanical strength are required so that a crystal phase is used and an amorphous phase is not used. Also, in the use as a heating element, a thermally unstable amorphous phase is not used as such, and only a crystal phase is used. Therefore, amorphous precipitates can be used for the first time by carrying out crystallization by heat treatment.

EXAMPLES

In the following, the present invention is explained in more detail by referring to Examples. The present invention is not limited by these Examples.

Example 1

1.0 g of $Na_2ZrF_6$ was added to 400 ml of distilled water and completely dissolved by stirring to prepare an aqueous solution. 10 g of $ZrO_2$ was added thereto, the mixture was stirred at 30° C. for 24 hours, and the powder of $ZrO_2$ which remained without dissolution was separated by filtration by using a quantitative filter paper (for chemical analysis) JIS P 3801 No. 5C. This filter paper had a holding particle size of 1 $\mu$m, and those having a particle size which was more than that were separated by filtration to obtain a transparent solution in which $ZrO_2$ fine crystallites having a particle size of less than 1 $\mu$m remained in the filtrate dispersively. 40 ml of the aqueous solution containing the fine crystallites thus obtained was taken in a polystyrene container, a glass substrate was soaked, and $2.0\times10^{-4}$ mol of $H_3BO_3$ as an aqueous solution was added immediately. After 1 hour, the same amount of $H_3BO_3$ was further added, and the mixture was left to stand at 30° C. for 3 days while the substrate was soaked.

When the glass substrate was taken out and measured by X-ray diffraction (XRD), it was confirmed that a monoclinic $ZrO_2$ crystal thin film was formed on the surface of the glass substrate. Further, when it was observed by a scanning type electron microscope (SEM), the fine particles of $ZrO_2$ having a particle size of 5 $\mu$m or more existed dispersedly on the entire surface of the substrate, and a part of them were adhered mutually to form a thin film having a size of about 40 $\mu$m square. Also, by energy dispersion X-ray spectroscopic analysis (EDX), existence of zirconium was observed in the particles and in the thin film on the surface of the substrate. When addition of $H_3BO_3$ as an aqueous solution in each amount of $4.0\times10^{-4}$ mol was carried out every 1 hour 5 times, formation of a $ZrO_2$ crystal thin film was also observed, and a thickness thereof was 0.1 $\mu$m.

Example 2

40 ml of a transparent aqueous solution in which the fine crystallites of $ZrO_2$ were dispersed obtained by the same method as in Example 1 was taken in a polystyrene container, and a PES substrate was soaked. Then, $H_3BO_3$ as an aqueous solution in each amount of $4.0\times10^{-4}$ mol was added every 1 hour 5 times, and the mixture was left to stand at 39° C. for 3 days while the substrate was soaked. When the PES substrate was taken out and measured by XRD, it was confirmed that a monoclinic $ZrO_2$ thin film was formed on the surface of the PES substrate. The index and position of the peaks of X-ray diffraction are as shown in Table 1, and the spacing was sufficiently coincident with that of monoclinic ZrO2. Further, by SEM, it was confirmed that crystal precipitates in which the particles of ZrO2 were adhered mutually were formed.

TABLE 1

| 2θ | h | k | l | d (Å) |
|---|---|---|---|---|
| 28.21 | −1 | 1 | 1 | 3.161 |
| 31.43 | 1 | 1 | 1 | 2.844 |

Example 3

0.50 g of $ZrO_2$ was added to 100 ml of a 23% HF aqueous solution and dissolved by stirring at 30° C. for 24 hours. The powder of $ZrO_2$ which remained without dissolution was removed by filtration in the same manner as in Example 1. 40 ml of a transparent solution in which the fine crystallites of $ZrO_2$ were dispersed thus obtained was taken in a polystyrene container, a PES substrate was soaked, and $1.1 \times 10^{-1}$ mol of $H_3BO_3$ powder was added immediately. When the mixture was left to stand at 30° C. for 3 days while the substrate was soaked, formation of $ZrO_2$ crystal precipitates which were similar to those obtained in Example 2 was observed on the surface of the substrate.

Example 4

40 ml of a transparent aqueous solution in which the fine crystallites of $ZrO_2$ were dispersed obtained by the same method as in Example 1 was taken in a polystyrene container, and an aluminum plate was soaked as a substrate. Then, $H_3BO_3$ as an aqueous solution was added in each amount of $4.0 \times 10^{-4}$ mol every 1 hour 3 times, and the mixture was left to stand at 30° C. for 3 days while the substrate was soaked.

A white coating film having a thickness of about 1 μm was produced adherently on the entire surface of the aluminum plate. When it was measured by XRD, it was confirmed that said coating film was the crystals of $ZrO_2$. From this fact, it can be seen that the aluminum plate acted as a fluoride ion-capturing agent to accelerate production of $ZrO_2$.

Example 5

$ZrO_2$ and $HfO_2$ were mixed at a molar ratio of 9:1, and the mixture was calcined at 1,400° C. for 24 hours to prepare a $0.9\ ZrO_2.0.1\ HfO_2$ solid solution. 0.50 g of the powder of this solid solution was added to 100 ml of a 23% HF aqueous solution and dissolved by stirring at 30° C. for 24 hours. The solid solution powder which remained without dissolution was removed by filtration in the same manner as in Example 1. 40 ml of a transparent solution in which the fine crystallites of the solid solution were dispersed thus obtained was taken in a polystyrene container, a PES substrate was soaked, and $1.1 \times 10^{-1}$ mol of $H_3BO_3$ was added immediately. The mixture was left to stand at 30° C. for 3 days while the substrate was soaked.

By XRD, it was confirmed that monoclinic crystals which were the same as $ZrO_2$ and $HfO_2$ existed on the surface of the substrate. From this fact and the results of observation by SEM and analysis by EDX, it was confirmed that Zr and Hf were contained in the precipitated crystals, and the crystal thin film of a $ZrO_2$-$HfO_2$ solid solution was formed on the surface of the substrate.

Example 6

In the same manner as in Example 3 except for using 0.5 g of $HfO_2$ in place of $ZrO_2$, a transparent solution in which $HfO_2$ fine crystallites were dispersed was obtained. A PES substrate was soaked therein and treated under the same conditions as in Example 3. By XRD, it was confirmed that a monoclinic $HfO_2$ crystal thin film was formed on the surface of the substrate.

Example 7

In the same manner as in Example 3 except for using 0.5 g of $Y_2O_3$ in place of $ZrO_2$, a transparent solution in which $Y_2O_3$ fine crystallites were dispersed was obtained. A PES substrate was soaked therein and treated under the same conditions as in Example 3. By XRD, it was confirmed that the precipitates of cubic $Y_2O_3$ crystals were formed on the surface of the substrate.

Example 8

$ZrO_2$ and $Y_2O_3$ were mixed at a molar ratio of 98:2, and the mixture was calcined at 1,400° C. for 24 hours to prepare a $0.98\ ZrO_2.0.02\ Y_2O_3$ solid solution. By using the powder of this solid solution, a solution was obtained in the same manner as in Example 5. In the same manner as in Example 5 except for suspending 0.01 mg of the above fine powder of the solid solution in water and adding the suspension thereto, soaking a PES substrate and making the amount of $H_3BO_3$ added $1.1 \times 10^{-1}$ mol, the substrate was treated.

By XRD, existence of crystals giving the similar diffraction peak as that of monoclinic $ZrO_2$ was confirmed on the surface of the substrate. From this fact and the results of observation by SEM and analysis by EDX, it was confirmed that Zr and Y were contained in the precipitated crystals, and the thin film of a monoclinic $ZrO_2$-$Y_2O_3$ solid solution was formed on the surface of the substrate.

Example 9

0.5 g of $La_2O_3$ was added to 120 ml of a 23% HF aqueous solution and dissolved by stirring at 30° C. for 40 hours. The $La_2O_3$ powder which was not dissolved was separated by filtration in the same manner as in Example 1 to obtain a transparent solution in which $La_2O_3$ fine crystallites were dispersed. Each 30 ml of this solution was taken in 3 polystyrene containers, PES substrates were soaked, $2.5 \times 10^{-3}$ mol (as an aqueous solution), $5.0 \times 10^{-3}$ mol (as an aqueous solution) or $1.1 \times 10^{-1}$ mol (as powder) of $H_3BO_3$ was added, and the mixtures were left to stand at 30° C. for 60 hours. As a result of XRD, in the cases using either amount of $H_3BO_3$ added, formation of the thin film of hexagonal $La_2O_3$ crystals was observed on the surface of the substrate.

Example 10

1.0 g of $La_2O_3$ was added to 400 ml of a 12% HF aqueous solution and dissolved by stirring at 30° C. for 24 hours. The $La_2O_3$ powder which remained without dissolution was separated by filtration in the same manner as in Example 1 to obtain a transparent filtrate in which $La_2O_3$ fine crystallites were dispersed. 30 ml of the filtrate was taken in a polystyrene container, a PES substrate was soaked, $4.0 \times 10^{-2}$ mol of $H_3BO_3$ powder was added, and the mixture was left to stand at 30° C. for 6 days.

As a result of measuring the surface of the substrate by XRD, the peak of $La_2O_3$ was observed, and it was confirmed that $La_2O_3$ crystals were produced on the surface of the substrate. By SEM, a large number of particles having a particle size of about 10 μm were produced on the surface of the substrate. As a result of EDX, the existing region of the particles was coincident with that of La to confirm that the above particles were hexagonal $La_2O_3$ crystals.

Example 11

2.0 g of $Na_2ZrF_6$ was added to 400 ml of distilled water and dissolved completely by stirring to prepare an aqueous solution of $Na_2ZrF_6$. 10 g of $ZrO_2$ was added thereto and dissolved by stirring at 30° C. for 24 hours, and the $ZrO_2$ powder which remained without dissolution was separated by filtration in the same manner as in Example 1 to obtain a transparent solution A in which $ZrO_2$ fine crystallites were dispersed. On the other hand, 0.5 g of $HfO_2$ powder was added to 100 ml of a 23% HF aqueous solution, the mixture was stirred, at 30° C. for 24 hours, and then the $HfO_2$ powder which remained without dissolution was separated by filtration in the same manner as in Example 1 to obtain a transparent solution B in which $HfO_2$ fine crystallites were dispersed. 30 ml of the solution A and 10 ml of the solution B were mixed and charged into a polystyrene container, a PES substrate was soaked, and $2.5 \times 10^{-2}$ mol of $H_3BO_3$ powder was added. This mixture was left to stand at 30° C. for 3 days.

By XRD, it was confirmed that monoclinic crystals which were similar to $ZrO_2$ and $HfO_2$ existed on the surface of the substrate. From this fact and the results of observation by SEM and analysis by EDX, it was confirmed that Zr and Hf were contained in the precipitated crystals, and the thin film of a $ZrO_2$-$HfO_2$ solid solution was formed on the surface of the substrate.

Example 12

Each 40 ml of a transparent solution in which $ZrO_2$ fine crystallites were dispersed obtained by the same method as in Example 3 was taken in 2 polystyrene containers, and PES substrates were soaked, respectively. Further, on a part of each substrate, soda-lime glass was superposed. Then, $8.0 \times 10^{-2}$ mol of $H_3BO_3$ powder was added to one of the solutions. These solutions were left to stand at 30° C. for 3 days while the substrates were soaked.

When both of the substrates were taken out and applied to XRD, in both of them, precipitation of monoclinic $ZrO_2$ was observed on the surface of the substrate. By superposing the glass, on the substrate of the case where $H_3BO_3$ was not added to the solution, precipitation of $ZrO_2$ was also observed at that portion. When $H_3BO_3$ was added, the precipitates at the portion where the glass was superposed were thicker than those at the other portion. In both of the cases, the glass was corroded considerably, and it is apparent that a component thereof contributed as a fluoride ion-capturing agent.

Example 13

5.0 g of $ZrO_2$ was added to 200 ml of a 0.12% HF aqueous solution and dissolved by stirring at 30° C. for 24 hours. The $ZrO_2$ powder which remained without dissolution was removed by filtration in the same manner as in Example 1 to obtain a transparent solution in which $ZrF_6^{2-}$ complex ions were contained and $ZrO_2$ fine crystallites were dispersed. Each 40 ml of this solution was taken in 3 polystyrene containers, which were defined as Sample 13-1 to 13-3. Glass substrates were soaked, respectively, a $H_3BO_3$ aqueous solution was added as shown in Table 2, and the mixtures were left to stand at 30° C. for 3 days.

TABLE 2

| | Addition of $H_3BO_3$ | | | |
|---|---|---|---|---|
| Sample | Each amount added (mol) | Number of addition | Interval of addition (h) | Total amount (mol) |
| 13-1 | $0.4 \times 10^{-3}$ | 1 | — | $0.4 \times 10^{-3}$ |
| 13-2 | " | 3 | 1 | $1.2 \times 10^{-3}$ |
| 13-3 | " | 5 | 1 | $2.0 \times 10^{-3}$ |

In all of the samples, when the surface of the substrate was measured by XRD, it was confirmed that monoclinic $ZrO_2$ was produced. In Sample 13-1, it was observed that the surface of the substrate was slightly corroded by hydrofluoric acid. In Samples 13-2 and 13-3, corrosion was not observed.

Example 14

Each 40 ml of a transparent aqueous solution in which $ZrO_2$ fine crystallites were dispersed obtained by adding $Na_2ZrF_6$ and $ZrO_2$ to distilled water by the same method as in Example 1 was taken in 4 polystyrene containers. Without soaking a substrate, $4.0 \times 10^{-4}$ mol, $1.2 \times 10^{-3}$ mol or $2.0 \times 10^{-3}$ mol of $H_3BO_3$ as an aqueous solution was added, respectively, and $H_3BO_3$ was not added to the remaining one, and all the mixtures were left to stand at 30° C. for 3 days. In either of the aqueous solution to which $H_3BO_3$ was added, production of white precipitates was observed, and the aqueous solution to which $H_3BO_3$ was not added was not changed at all. When XRD of the precipitates was measured, the peaks of monoclinic $ZrO_2$ were observed to confirm that said white precipitates were monoclinic $ZrO_2$.

Example 15

Each 40 ml of a transparent aqueous solution in which $ZrO_2$ fine crystallites were dispersed obtained by adding $Na_2ZrF_6$ and $ZrO_2$ to distilled water by the same method as in Example 1 was taken in 3 polystyrene containers. Polystyrene, PES or PET was soaked as a substrate, respectively, and $H_3BO_3$ as an aqueous solution was added in each amount of $4.0 \times 10^{-4}$ mol every 1 hour 5 times. Thereafter, the mixtures were left to stand at 30° C. for 3 days.

When XRD of the surfaces of the respective substrates was measured, it was confirmed that monoclinic $ZrO_2$ crystals were formed on the surfaces of the PES substrate and the PET substrate. The peak intensity of XRD of the PET surface was larger than that of the PES surface to show that a more amount of the $ZrO_2$ crystals were produced. As a result of measurement by XRD, $ZrO_2$ crystals were not produced on the surface of the polystyrene substrate.

Comparative Example 1

1.5 g of $Na_2ZrF_6$ was dissolved in 600 ml of distilled water to obtain an aqueous solution. 40 ml of this aqueous solution was taken in polystyrene containers, and a glass substrate was soaked. $H_3BO_3$ as an aqueous solution was added thereto in each amount of $4.0 \times 10^{-4}$ mol at intervals of 1 hour 9 times, and the mixture was left to stand at 30° C. for 5 days.

The glass substrate was taken out, and the surface of the substrate was measured by XRD. However, no peak was observed, and $ZrO_2$ in a crystalline state was not obtained.

Comparative Example 2

1.0 g of $Na_2ZrF_6$ was dissolved in 400 ml of distilled water to obtain an aqueous solution. 10 g of $ZrO_2$ was added to this aqueous solution, the mixture was stirred at 30° C. for 24 hours, and $ZrO_2$ which remained without dissolution was separated by filtration in the same manner as in Example 1 to obtain a transparent aqueous solution in which fine crystallites were dispersed. This solution was further filtered by a membrane filter having a pore size of 0.1 μm to remove the fine crystallites completely. 40 ml of this aqueous solution was taken in polystyrene containers, and a glass substrate was soaked. $H_3BO_3$ as an aqueous solution was added thereto in each amount of $4.0 \times 10^{-4}$ mol 5 times, and the mixtures were left to stand at 30° C. for 3 days.

The glass substrate was taken out, and the surface of the substrate was measured by XRD. However, no peak was observed, and $ZrO_2$ in a crystalline state was not obtained.

I claim:

1. A process for producing metal oxide precipitates of at least one rare earth metal oxide, which process comprises:
   a. forming a solution containing at least one of a soluble acid or salt of said rare earth metals, said acid or salt being selected from the group consisting of
      a metal fluoro complex compound represented by the formula $$A_aM_bF_c \qquad (I)$$

wherein
   A represents a hydrogen atom, an alkali metal atom, an ammonium group or a coordinated water molecule;
   M represents a rare earth metal;
   a, b and c are each a number of 1 or more and a number making said metal complex compound electrically neutral, and when a is two or more, a plural number of A's may be the same or different from each other, and
   a metal fluoride of a rare earth metal which excludes the metal fluoro complex of formula (I) and is gadolinium fluoride;
   b. adding to said solution, at least one fluoride ion-capturing agent selected from the group consisting of boric acid, borates, sodium hydroxide, aqueous ammonia, aluminum, titanium, iron, nickel, magnesium, copper, zinc, glass, silicon, calcium oxide, boron oxide, aluminum oxide, silicon dioxide, and magnesium oxide in a homogenous state or heterogeneous state and in an amount sufficient to cause precipitation of said metal oxide or a solid solution containing at least one of said metal oxides.

2. The process according to claim 1, wherein a substrate to be coated is placed in the reaction medium and is subsequently coated during the precipitation.

3. The process according to claim 2, wherein said precipitates are a thin film.

4. The process according to claim 1, wherein at least one compound selected from said metal fluoro complex compound and said metal fluoride is produced by reacting said rare earth metal oxide with a hydrofluoric acid in a hydrofluoric acid solution.

5. The process according to claim 4, wherein said rare earth metal oxide is at least one selected from the group consisting of scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide and lutetium oxide.

6. The process according to claim 5, wherein said rare earth metal oxide is at least one selected from the group consisting of a mutual solid solution comprising the rare earth metal oxides; and a solid solution containing the rare earth metal oxide and an oxide of an alkaline earth metal or a transition metal.

7. The process according to claim 1, wherein the metal fluoro complex compound is used and is a compound represented by the formula (I).

8. The process according to claim 1, wherein the metal oxide is at least one oxide selected from yttrium oxide and lanthanum oxide.

9. The process according to claim 1, wherein the fluoride ion-capturing agent is boric acid.

10. The process according to claim 1, wherein said metal oxide precipitate is lanthanum oxide.

11. The process according to claim 1, wherein said metal fluoro complex compound is at least one selected from the group consisting of a fluorocerium (IV) complex compound, a fluoroyttrium complex compound, a fluoroscandium complex compound, a fluorolanthanum complex compound and a fluorocerium (III) complex compound.

12. The process according to claim 1, wherein said fluoride ion-capturing agent is orthoboric acid.

13. The process according to claim 1, wherein said fluoride ion-capturing agent is boron oxide.

14. The producing process according to claim 1, wherein said fluoride ion-capturing agent is aluminum or nickel.

15. The process according to claim 1, wherein said fluoride ion-capturing agent is glass.

16. The process according to claim 1, wherein said fluoride ion-capturing agent is silicon dioxide.

17. The process according to claim 1, wherein said fluoride ion-capturing agent is metaboric acid.

18. The process according to claim 1, wherein said fluoride ion-capturing agent is titanium, magnesium, iron, zinc, calcium oxide or magnesium oxide.

19. A process for producing metal oxide precipitates of at least one of an oxide of a rare earth, zirconium or hafnium, which process comprises
   a. forming a solution containing at least one of a soluble acid or salt of said metals, said acid or salt being selected from the group consisting of
      a metal fluoro complex compound represented by the formula (I):

$$A_aM_bF_c \qquad (I)$$

wherein A represents a hydrogen atom, an alkali metal atom, an ammonium group or a coordinated water molecule; M represents a rare earth metal; a, b and c are each a number of 1 or more and a number making said metal complex compound electrically neutral, and when a is two or more, a plural number of A's may be the same or different from each other; and
      a metal fluoride of a rare earth metal, zirconium or hafnium which excludes the metal fluoro complex compound of formula (I) and is at least one selected from the group consisting of zirconium fluoride, hafnium fluoride and gadolinium fluoride;
   b. presenting seed crystal(s) comprising at least one oxide selected from a rare earth metal oxide, zirconium oxide and hafnium oxide, and
   c. adding to said solution, at least one fluoride ion-capturing agent selected from the group consisting of boric acid borates, sodium hydroxide, aqueous ammonia, aluminum, titanium, iron, nickel, magnesium, copper, zinc, glass, silicon, calcium oxide, boron oxide, aluminum oxide, silicon dioxide, and magnesium oxide, in a homogenous state or heterogeneous state and in an amount sufficient to cause precipitation of at least one oxide selected from the group consisting of a rare earth metal oxide, zirconium oxide and hafnium oxide, or crystal of a solid solution containing at least one of said metal oxides.

20. The producing process according to claim 19, wherein a substrate is soaked in the above solution to form said precipitates on the surface of the substrate.

21. The producing process according to claim 20, wherein said precipitates are a thin film.

22. The process according to claim 19, wherein at least one selected from said metal fluoro complex compound and said metal fluoride is produced by reacting said metal oxide with hydrofluoric acid in a hydrofluoric acid solution.

23. The process according to claim 22, wherein said metal oxide is at least one selected from the group consisting of zirconium oxide, hafnium oxide, scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide and lutetium oxide.

24. The process according to claim 23, wherein said metal oxide is at least one selected from the group consisting of a mutual solid solution comprising at least two of the metal oxides of claim 39; a solid solution containing at least one of said metal oxide and an oxide of an alkaline earth metal, a transition metal or a IIIA group metal of the periodic table.

25. The process according to claim 19, wherein the seed crystal(s) is/are obtained by reacting an oxide with less than stoichiometric amounts of hydrofluoric acid in a hydrofluoric acid solution and then allowing residual oxide crystallites to remain in the solution.

26. The process according to claim 19, wherein the metal fluoro complex compound is used and is a compound represented by the formula (I).

27. The process according to claim 19, wherein the fluoride ion-capturing agent is boric acid.

28. The process according to claim 19, wherein said metal oxide precipitate is zirconium oxide crystal.

29. The process according to claim 19, wherein said metal fluoro complex compound is at least one selected from the group consisting of a fluorozirconium complex compound and a fluorohafnium complex compound.

30. The process according to claim 19, wherein said metal fluoro complex compound is at least one selected from the group consisting of a fluorocerium (IV) complex compound, a fluoroyttrium complex compound, a fluoroscandium complex compound, a fluorolanthanum complex compound and a fluorocerium (III) complex compound.

31. The process according to claim 19, wherein said fluoride ion-capturing agent is orthoboric acid.

32. The process according to claim 19, wherein said fluoride ion-capturing agent is boron oxide.

33. The process according to claim 19, wherein said fluoride ion-capturing agent is aluminum or nickel.

34. The process according to claim 19, wherein said fluoride ion-capturing agent is glass.

35. The process according to claim 19, wherein said fluoride ion-capturing agent is silicon dioxide.

36. The process according to claim 19, wherein said fluoride ion-capturing agent is metaboric acid.

37. The process according to claim 19, wherein said fluoride ion-capturing agent is titanium, magnesium, iron, zinc, calcium oxide or magnesium oxide.

38. The process according to claim 19, wherein said seed crystal has a chemical composition which is different from that of said precipitates when they are of the same or similar crystal system.

* * * * *